INVENTOR.
Richard W. Bemmann
BY
Albert F. Duke
ATTORNEY 3,459,052
**CRUISE CONTROL SYSTEM AND ERROR
DETECTOR THEREFOR**
Richard W. Bemmann, Flint, Mich., assignor to General
Motors Corporation, Detroit, Mich., a corporation of
Delaware
Filed Sept. 27, 1966, Ser. No. 582,447
Int. Cl. G01p 7/00
U.S. Cl. 73—506                        8 Claims

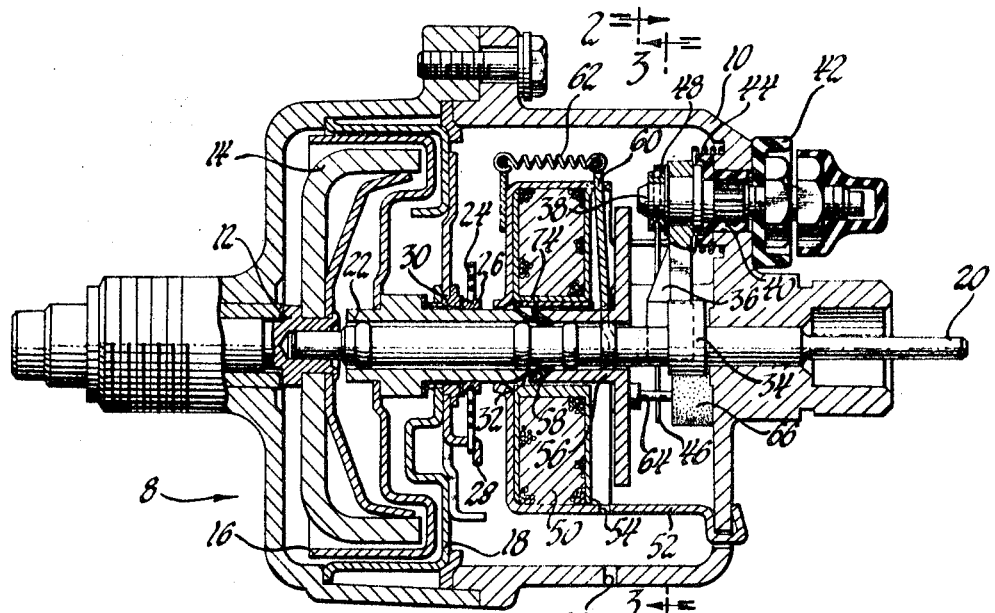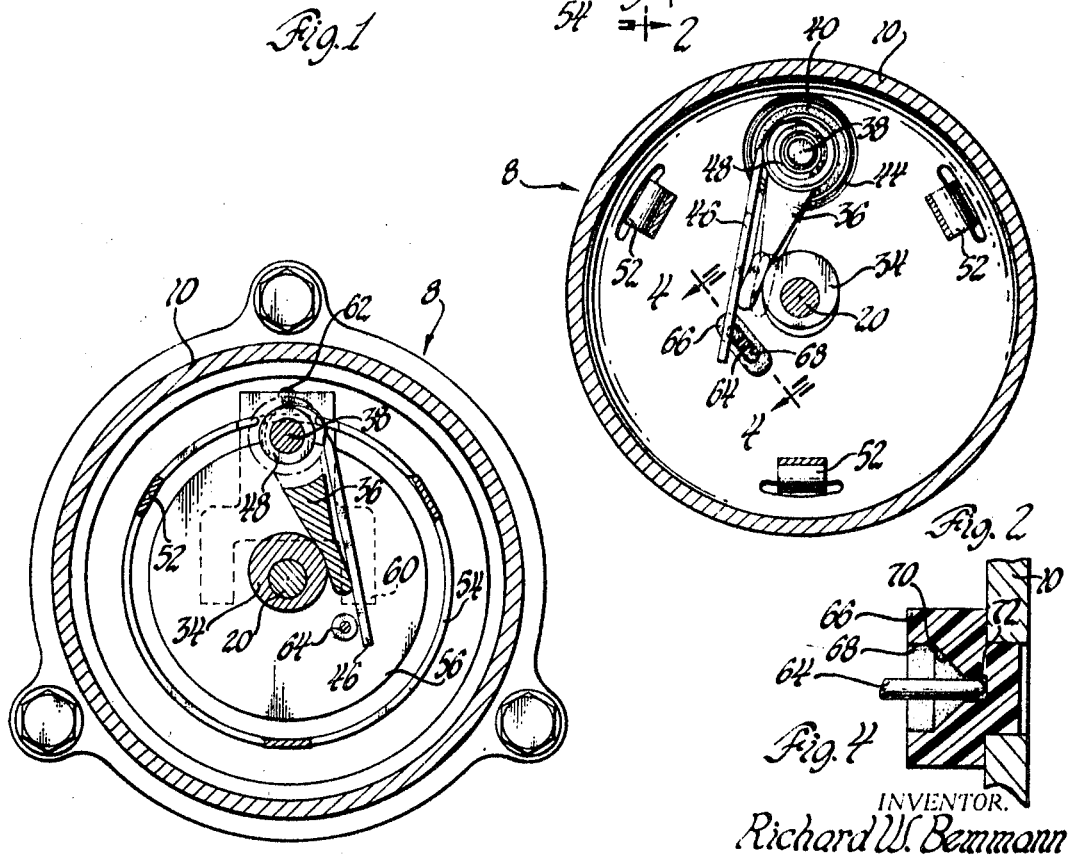

ABSTRACT OF THE DISCLOSURE

A cruise control system for a motor vehicle is disclosed which permits lockup at a prevailing vehicle speed and generation of a speed error signal in response to any deviations in vehicle speed subsequent to lockup. The speed error signal is generated by a speed transducer which includes a pair of contracts, one of which is oscillated through a predetermined arc corresponding to a fixed speed range. The other contact is normally located in a fixed position midway in said range but is adapted to be coupled to an element positionable in accordance with the prevailing speed of the vehicle in response to energization of a solenoid so that subsequent changes in the speed of the vehicle cause the other contact to engage the oscillating contact for a greater or lesser portion of the oscillating cycle to develop the speed error signal. Control circuitry is provided for energizing the solenoid and for permitting the vehicle operator to automatically accelerate or decelerate the vehicle to a new cruising speed.

---

This invention relates to control systems for a motor vehicle and more particularly to a speed control system for maintaining a motor vehicle at a predetermined road speed under varying road conditions.

In general, the prior art cruise control systems have employed a speed transducer or error detector responsive to actual vehicle speed and a desired vehicle speed to provide an error signal which is utilized to control the engine of the vehicle in such a manner as to reduce the error signal to zero and to maintain it as close to zero as possible. One such error detector is disclosed in the patent to McMurray et al. 3,087,340 assigned to the assignee of the present invention. In that error detector the desired vehicle speed input to the error detector is a manual adjustment by the operator of the vehicle. With such an error detector it is necessary for the operator to manually select a desired cruising speed, thereafter accelerate the vehicle to this speed and energize the control circuitry to maintain the vehicle at the desired speed.

In accordance with the present invention, a cruise control system is provided which permits automatic lock-up at the prevailing vehicle speed eliminating the necessity for the vehicle operator to manually set a desired cruising speed. In addition, the system of the present invention permits the operator, subsequent to lock-up of the system, to accelerate or decelerate the vehicle to a new cruising speed by means of a momentary contact push-pull engage switch.

The foregoing is accomplished by means of a novel speed transducer or error detector which may be inserted between the vehicle speedometer and speedometer drive cable and which produces an error signal indicative of the differences between a desired vehicle speed and the actual vehicle speed. The error signal is obtained by oscillating one of a pair of contacts through a predetermined arc corresponding to a fixed speed range of, for example, 5 miles per hour. The other contact is normally located in a fixed position midway in said range, but it is adapted to be selectively coupled to an element positionable in accordance with the prevailing speed of the vehicle. Thereafter, this other contact moves within said range in accordance with the prevailing speed of the vehicle and engages the oscillating contact for a greater or lesser portion of the oscillation cycle depending upon whether the speed of the vehicle after the coupling operation is below or above the prevailing speed at the time of the coupling operation. Control circuitry is provided including electromagnetic means for accomplishing the coupling operation and switch means, controlling both the electromagnetic means and engine speed control means, which permits the vehicle operator to automatically accelerate or decelerate the vehicle to a new cruising speed.

A more complete understanding of the present invention may be had from the following detailed description which should be read in conjunction with the drawings in which:

FIGURE 1 is a sectional view of the error detector of the present invention;

FIGURE 2 is a sectional view taken along lines 2—2 of FIGURE 1;

FIGURE 3 is a sectional view taken along lines 3—3 of FIGURE 1;

FIGURE 4 is a sectional view taken along lines 4—4 of FIGURE 2;

Figure 5:
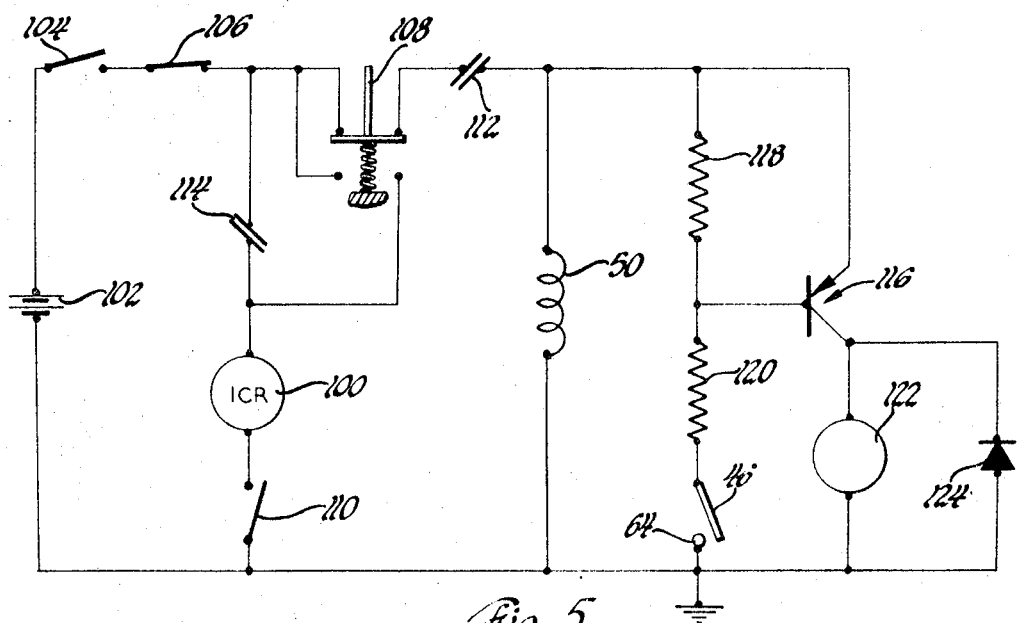
FIGURE 5 is a schematic diagram of the control circuitry of a cruise control system utilizing the error detector of FIGURE 1.

Referring now to the drawings and initially to FIGURE 1; there is illustrated an error detector unit 8 which includes a two part housing 10 enclosing a conventional speedometer drive mechanism which includes a drive shaft 12, a permanent magnet 14, a speed cup 16 and a field plate 18. The drive shaft 12 is connected to the speedometer drive cable (not shown). A spindle 20 is driven at one end by the drive shaft 12 and is supported at the other end by the housing 10. The spindle 20 supports a bearing bushing 22 which carries the speed cup 16. A torsion spring 24 has one end secured to a collar 26 mounted on the bushing 22 with the other end engaging a spring tension regulator 28. The speed cup 16 is rotatable about the spindle 20 and within a bushing 30 which carries the field plate 18. The permanent magnet 14 is driven by the drive shaft 12 and causes the speed cup 16 and consequently the bearing 22 to assume an angular orientation proportional to the speed of rotation of the magnet. The bearing 22 is provided with a serrated end 32 for a purpose more fully described hereinafter.

The spindle 20 as previously indicated rotates with the speedometer drive cable and may be utilized as the input to the conventional speedometer on the vehicle. The spindle 20 carries an eccentric 34 which as more fully shown in FIGURES 2 and 3 oscillates a follower arm 36 of insulating material which is rotatably mounted on an electrically conductive stud or terminal 38 which extends into the housing 10 and is insulated therefrom by an insulator piece 40 and an insulator cup 42. A spring 44 biases the follower arm 36 into engagement with the eccentric 34. A contact spring 46 is attached at one end to a conductive collet 48 secured to the terminal 38 and has a free end movable by the follower arm 36.

A solenoid coil 50 is supported within the housing 10 by a coil cover 52. The coil cover 52 as well as the housing 10 include openings 54 to accommodate the leads to the solenoid coil 50. An iron solenoid plunger 56 is provided with a serrated end portion 58 adapted to mate with the end 32 of the bearing 22 upon energization of the coil 50. The plunger 56 is normally maintained in the position shown by a pivotally mounted fork-shaped armature 60 and a spring 62. The plunger 56 is flanged at its opposite end and carries an electrically conductive pin 64 which normally extends axially within a locator 66 of insulating material which is bonded to the inner wall of the housing 12. As shown in FIGURE 4, the locator 66 includes a wedged-shaped opening 68 having inclined side walls 70 and a central depression 72. The pin 64 is normally located within the central depression 72, but is moved to the dotted line position when the coil 50 is energized. Energization of the coil 50 locks the plunger 56 with the bearing 22 and moves the pin 64 out of the depression 72 to a position extending only slightly into the opening 68. A section of iron 74 which is magnetized upon energization of the coil 50 attracts the armature 60 out of contact with the plunger 56 to prevent any interference with the rotation of the bearing 22. Upon deenergization of the coil 50, the spring 62 and armature 60 return the plunger 56 to its normal deactuated position with the pin 64 being guided to the central depression 72 by the side walls 70.

The conductive pin 64 is electrically grounded and thus applies ground potential to the terminal 38 whenever the pin 64 is in engagement with the contact spring 46. The contact spring 46 oscillates as a result of engagement with the follower arm 36 through a predetermined range corresponding to, for example, 5 miles per hour, the mid point of the oscillations occurring at the location of the pin 64 when located in the central depression 72. Thus when the coil 50 is energized rotation of the bearing 22 from the position prior to energization will cause the pin 64 to engage the contact spring 46 for a greater or lesser interval of time depending upon whether the speed of the vehicle has decreased or increased from the speed at the time of energization. Thus, the potential at the terminal 38 is of a square wave form having an average voltage proportional to the difference between the actual vehicle speed and the desired vehicle speed or prevailing vehicle speed at which the coil 50 is energized. That is to say the average voltage across the contact spring 46 and the pin 64 is zero volts at an actual speed of 2.5 miles per hour below the desired speed and is for example, 12 volts or battery voltage at 2.5 miles per hour above the desired speed and 6 volts at the desired speed. A more detailed explanation of the effect of changes in actual vehicle speed may be found in the aforementioned patent.

Referring now to FIGURE 5, a schematic diagram of the cruise control system is shown; a lockup relay 100 is connected across the battery 102 through the vehicle ignition switch 104, a normally closed brake pedal actuator switch 106, a momentary contact type push button switch 108 and a normally open low speed limit switch 110. The relay 100 includes contacts 112 and hold-in contacts 114. The low speed limit switch 110 is adapted to close at some predetermined speed such as 20 miles per hour and may be actuated from the speedometer speed cup or the vehicle transmission as is well known in the art. An amplifier including a transistor 116 and a pair of voltage dividing resistors 118 and 120 control a power unit 122 shunted by a diode 124. The power unit 122 may be a diaphragm type unit including a solenoid operated valve for porting air and vacuum to a diaphragm chamber for controlling the throttle of the vehicle as more fully shown and rescribed in the patent to Colling et al. 3,291,246 assigned to the assignee of the present invention. The error detector 8 is connected in the base circuit of the transistor 116 with the resistor 120 connected to the terminal 38. Thus, whenever the contact spring 46 and the contact pin 64 are in engagement the base circuit of the transistor 116 is grounded.

If the operator desires to place the vehicle in a cruise mode and the vehicle speed is the speed set by the low speed limit switch 110, the operator actuates the momentary push button switch 108 to energize the relay 100 which is maintained in an energized state through the contacts 114. The solenoid 50 is armed by closure of the contacts 112 and is energized upon return of the switch 108 to its normal position as shown. Closure of the contacts 112 also connects the battery 102 to the transistor 116 and the power unit 122 and oscillation of the spring contact 46 alternately opens and closes the base circuit of the transistor 116 for equal periods of time. If the actual vehicle speed should decrease the bearing 22 and the plunger 56 will rotate to a position where the contact pin 64 engages the oscillating spring contact 46 for a greater period of time thereby increasing the speed of the vehicle through the operation of the power unit 122 to return the vehicle to the speed at which the solenoid 50 was energized. While the vehicle will automatically be maintained at the speed at which the solenoid 50 was energized, the operator may if he so desires override this speed by depressing the accelerator to increase the speed of the vehicle. If the operator does increase the speed of the vehicle past that speed at which the solenoid 50 was energized the operator may if he so desires depress the push button 108 which deenergizes the solenoid 50 and upon release of the push button 108 the system will automatically respond to the new set speed, i.e., the speed at which the vehicle is traveling when the push button 108 is released. The operator may also decelerate the vehicle by merely pushing the button 108 and upon release of the button 108 the vehicle will lock in at the new lower car speed. If at any time when the system is in the cruise mode the brake pedal is depressed, the switch 106 will open to disconnect the control circuitry from the battery 102 and deenergize the solenoid 50.

Figure 6:
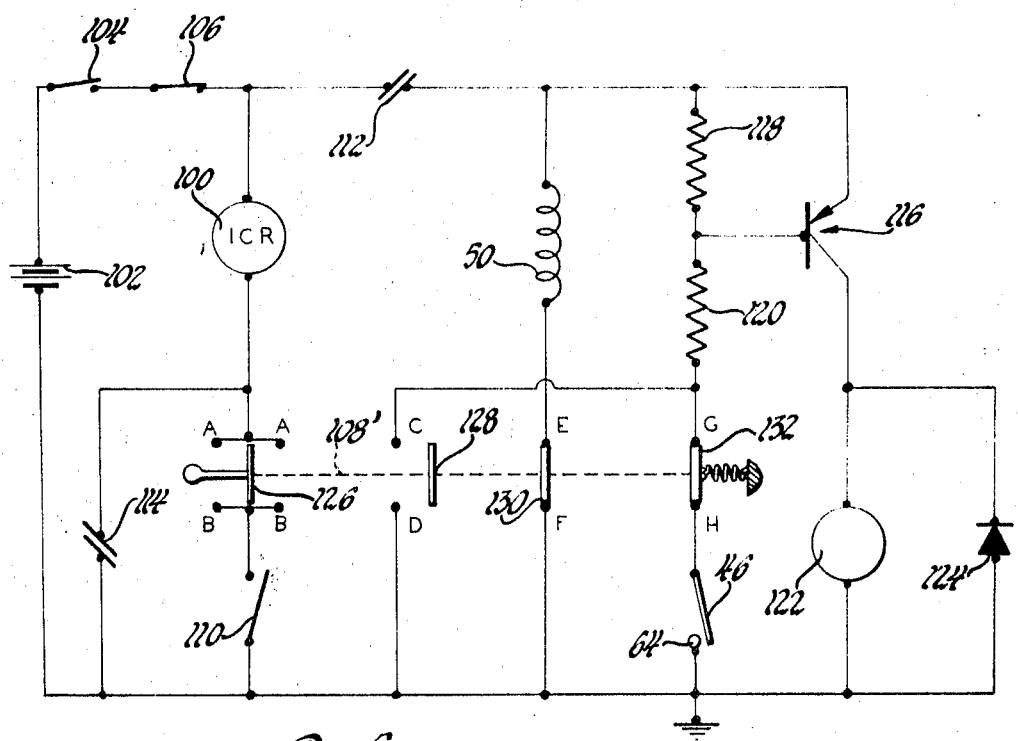
FIGURE 6 is a schematic diagram of a second embodiment of the control circuitry.

The circuit in FIGURE 5 has been modified in FIGURE 6 to provide automatic acceleration and deceleration to any driven speed as well as momentary push and pull engagement. As shown in FIGURE 6, the operating switch 108' includes a plurality of movable bridging contacts 126 through 132. In the normal position as shown, the bridging contacts 130 and 132 engage stationary contacts E, F, and G, H, respectively to close the circuit to the solenoid coil 50 and the base circuit of the transistor 116. At any speed above the low limit speed at which the switch 110 is closed, the switch 108' may be pushed or pulled to engage stationary contacts A, B energizing the relay 100 and arming the solenoid 50. Release of the switch 108' energizing the solenoid 50 through the contacts E, F and 130 to maintain the vehicle speed. If the vehicle is cruising at a particular speed, deceleration to some lower speed may be accomplished by pushing the switch 108' and releasing at the lower speed. In addition, however, the switch 108' may be pulled to accelerate the vehicle to a new cruise speed at which time the movable contact 128 engages the stationary contact C, D to connect the resistor 120 to ground and break the circuit at E, F and G, H. Release of the switch 108' closes the circuit at E, F and G, H to automatically set a new cruise speed.

While the invention has been described with regards to a preferred embodiment thereof, this should not be construed in a limiting sense. Modifications and variations will now occur to those skilled in the art. For a definition of the invention reference is made to the appended claims.

It is claimed:

1. An error detector for developing an output signal related to the difference between a prevailing vehicle speed and a desired vehicle speed, said detector comprising vehicle speed sensing means including a rotatably mounted element arcuately movable in proportion to the prevailing speed of said vehicle, contact means including first and second contact elements, cam means for oscillating said first contact through a path a predetermined distance related to a fixed speed range, lockup means supporting said second contact element, locator means normally locating said second contact element substantially at the middle of said path which is midway in said speed range, said lockup means adapted upon energization to couple said second contact to said rotatably mounted element for arcuate movement therewith whereby vehicle speed variations subsequent to energization of said lockup means varies the time of contact between said first and second contact.

2. The error detector defined by claim 1 wherein said lockup means comprises a stationary coil, a rotatably mounted plunger axially movable in response to energization of said coil, a pivotally mounted spring biased armature normally biasing said plunger out of engagement with said rotatable element and means responsive to energization of said coil for magnetically attracting said armature and maintaining said armature out of engagement with said plunger.

3. The error detector defined by claim 2 wherein said cam means includes a rotatably driven spindle, an eccentric cam secured to said spindle, a cam follower element of insulating material biased into engagement with said cam, said first contact being located in the path of movement of said follower arm, said second contact extending axially from said plunger into the path of movement of said first contact.

4. The error detector defined in claim 3 wherein said locator means comprises an insulating element having a wedge shaped opening and including inclined side walls and a central depression and receiving one end of said second contact, the contour of said opening normally locating said second contact element in said central depression, the axial movement of said plunger being such that at least a portion of said second contact element extends into said opening at all times.

5. In combination, a vehicle engine speed control mechanism for adjusting the speed of a vehicle in accordance with a speed error signal, speed error signal generating means comprising speed sensing means including a rotatably mounted element arcuately movable in proportion to the prevailing speed of said vehicle, oscillating contact means movable through a path a predetermined distance related to a fixed speed range, additional contact means, means normally locating said additional contact means substantially at the middle of said path which is midway in said speed range, electromagnetic means for coupling said speed sensing means to said additional contact means whereby vehicle speed variation subsequent to energization of said electromagnetic means varies the time of contact between said oscillating contact means and said additional contact means thereby developing said speed error signal and control circuitry actuable by the operator of said vehicle for controlling the energization of said electromagnetic means and rendering said engine speed control mechanism responsive to said speed error signal.

6. The cruise control system defined by claim 5 wherein said control circuitry comprises a source of electrical power, said contact means being connected across said source, relay means including a relay coil and first and second pairs of normally open contacts, said relay coil and said first pair being connected in series across said source, a momentary contact push button switch normally connecting one of said second pair of contacts to said source, but movable to momentarily shunt said first pair of contacts and energize said relay coil, said electromagnetic means being connected to the other of said second pair of contacts and said source.

7. The system defined in claim 6 wherein said control circuitry further includes a normally open limit switch connected in series with said relay coil and adapted to close at a predetermined speed.

8. The cruise control system defined by claim 5 wherein said control circuitry comprises a source of power, a transistor having emitter, collector, and base electrodes, said speed control mechanism being connected across said source through the emitter-collector circuit of said transistor, said contact means being connected in the base circuit of said transistor and adapted to cyclically open and close said base circuit for intervals of time dependent on the difference between the prevailing vehicle speed at the time of energization of said electromagnetic means and the vehicle speed subsequent to energization of said electromagnetic means, switching means comprising a relay coil, first and second pairs of normally open contacts operated by said coil, a push-pull momentary contact switch including first, second, third and fourth simultaneously movable contacts, means normally biasing said push-pull switch to a neutral position wherein said first movable contact connects said contact means in said base circuit and said second movable contact connects said electromagnetic means across said source through said second pair of contacts, said switch being movable to a pull position wherein said third movable contact establishes a circuit in shunt with said first movable contact and said contact means, said fourth movable contact adapted to shunt said first pair of contacts in either the push or pull position of said switch.

References Cited
UNITED STATES PATENTS 1,861,180   5/1932   Grob.

JAMES J. GILL, Primary Examiner

C. E. PHILLIPS, Assistant Examiner

U.S. Cl. X.R.

73—518; 180—110